March 22, 1927.  L. E. LA BRIE  1,621,794

BRAKE SHOE

Filed Nov. 2, 1925

INVENTOR
LUDGER E. LA BRIE
BY
M. W. McConkey
ATTORNEY

Patented Mar. 22, 1927.

1,621,794

UNITED STATES PATENT OFFICE.

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE SHOE.

Application filed November 2, 1925. Serial No. 66,254.

This invention relates to brake shoes, and is illustrated as embodied in shoes for a well-known type of self-energizing automobile brake. Various features of novelty relate to the construction of the shoe so that the thrust from a novel brake-applying part is transmitted to both of two stiffening flanges; to the use of a new form of steady rest as part of the means fastening the shoe together; and to other novel and desirable constructions which will be apparent from the following description of the illustrative embodiment shown in the accompanying drawing, in which.

Figure 1:
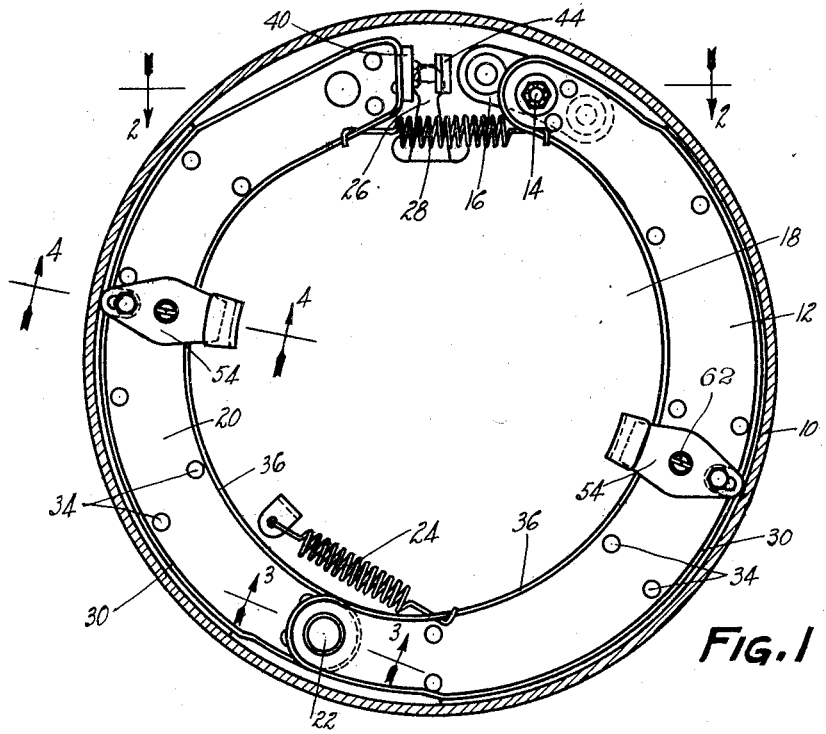
Fig. 1 is a vertical section through the brake, taken just inside the wheel, and showing the shoes in side elevation.
Figure 2:
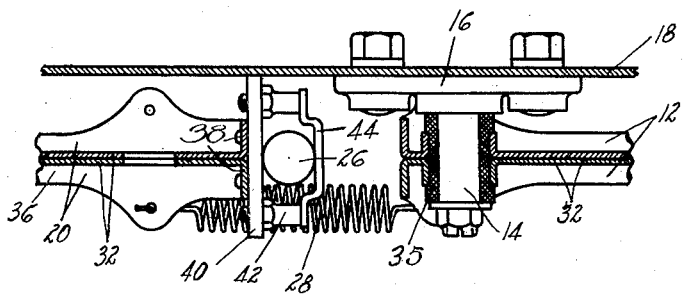
Fig. 2 is a partial section through the ends of the shoes on the line 2—2 of Fig. 1.
Figure 3:
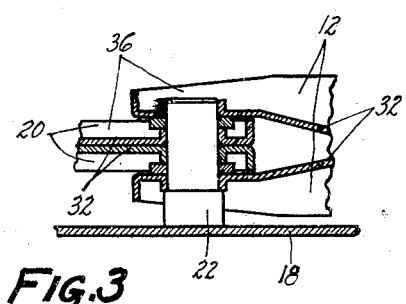
Fig. 3 is a partial section on the line 3—3, Fig. 1, showing the connection of the shoes.

The illustrated brake includes a drum 10, within which are arranged a shoe 12 anchored at 14 on a bracket 16 bolted to a backing plate 18, and a shoe 20 connected to shoe 12 by a pivot pin 22 having a head slidably engaging the backing plate 18 (Fig. 3).

Shoe 12 is held away from the drum by a spring 24 until shoe 20 turns with the drum and overcomes the spring. Shoe 20 is forced against the drum by the ball end of a lever 26 against the resistance of a return spring 28 connected at its ends to shoes 12 and 20. When the brake is used on a front wheel, the point of operative engagement of lever 26 with the brake, when the brake is applied, is substantially in the swivelling axis of the wheel.

The present invention relates to the construction of the shoes 12 and 20. Each shoe is built up by fastening together back to back two pressed metal sections or "stampings", each having a cylindrical flange 30 forming half the friction face, and a radial flange 32. The radial flanges 32 are in engagement with each other and are fastened together by rivets or the like 34.

Flanges 32 of shoe 20 are in the same plane throughout, but flanges 32 of shoe 12 are spread apart at the unanchored end of the shoe to straddle the end of shoe 12, and all four of the flanges have outwardly-directed tubular integral projections sleeved on the pivot pin 22. At its anchored end, flanges 32 of shoe 12 have outwardly-directed tubular integral projections sleeved on a bushing 35 carried by the anchor 14. I prefer to provide the radial flanges 32 of both shoes with generally cylindrical stiffening flanges 36 at their inner edges.

At its free end, shoe 20 has radial cross flanges 38, shown integral with both flanges 36 and 32, and to which are riveted or otherwise secured a novel lever-embracing thrust member 40, to which is secured by spacers or posts 42 a crosspiece 44. Member 40 and crosspiece 44 embrace between them the ball end of lever 26, thus forming in effect the socket member of a ball-and-socket joint, and transmitting the brake-applying thrust directly to both flanges 32 of shoe 20.

Figure 4:
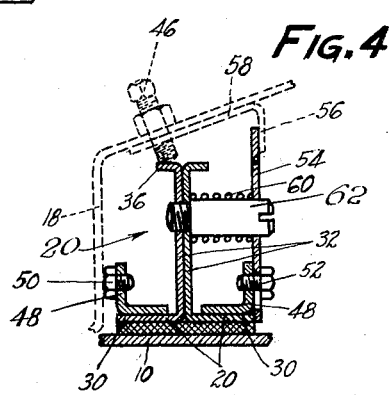
Fig. 4 is a radial section on the line 4—4, Fig. 1, showing one of the steady rests.

Backing plate 18 may carry one or more adjustable stops 46 (Fig. 4) engaging flanges 36, and cooperating with springs 24 and 28 to determine the idle positions of the shoes.

Preferably there are welded or otherwise secured to the flanges 30 of each shoe, a pair of right-angled stampings or lugs 48, having their ends projecting inwardly of the shoe from the side edges of the flanges. One of the lugs carries a setscrew 50 or the like engaging backing plate 18, and serving as a steady rest for its side of the shoe. The other one has loosely clamped thereto by a setscrew 52, a side plate 54. Plate 54 has a relatively large slot for setscrew 52, and consequently can fulcrum about its outer end on flange 30, to swing its inner end against a positioning flange 56 on a stamping 58 secured to the backing plate 18. A spring 60 serves to urge plate 54 against flange 56 and, by its reaction, to urge setscrew 50 yieldingly against the backing plate. Spring 60 is confined between plate 54 and flanges 32 of the shoe, and is sleeved on a steady-rest pin 62 threaded through the two flanges 32 and additionally fastening them together, and loosely passing through an opening in plate 54.

While one illustrative embodiment has been described in detail, it is not my intention to limit the scope of the invention to that particular embodiment, or otherwise than by the terms of the appended claims.

I claim:

1. A brake shoe of pressed metal including a pair of stiffening flanges, and a lever-embracing part having spaced portions to engage opposite sides of the lever and forming in effect the socket of a ball-and-socket joint and arranged at the end of the shoe to transmit thrust to both flanges.

2. A brake shoe of pressed metal including a pair of centrally-arranged stiffening flanges, and a lever-embracing part including a cross piece having spaced posts securing it to a member engaging the flanges and forming in effect the socket of a ball-and-socket joint and bridging across the ends of said flanges and arranged positively to transmit to both of them both brake-applying thrust and brake-releasing tension.

3. A brake shoe of pressed metal having two radial stiffening flanges and a steady-rest pin having a part passing through and positively secured to both of said flanges.

4. A brake shoe of pressed metal having two centrally-arranged radial stiffening flanges fastened together and a steady-rest pin having a part passing through both of said flanges and additionally fastening them together.

5. A brake shoe of pressed metal having two centrally-arranged radial stiffening flanges fastened together and a steady-rest pin having a shank threaded through both of said flanges.

6. A brake shoe of pressed metal having two centrally-arranged radial stiffening flanges fastened together and a steady-rest pin having a part passing through both of said flanges and additionally fastening them together, together with a side plate fulcrumed at its end on the shoe and having an opening for the end of said pin, and a spring sleeved on the pin and confined between the side plate and the flanges.

7. A pressed metal brake shoe built up of two sections, each having a cylindrical flange and a radial flange, arranged back to back with the radial flanges fastened together, a pair of right-angled lugs secured to the insides of the opposite cylindrical flanges and having their ends projecting inwardly from the side edges of the shoe.

8. A pressed metal brake shoe built up of two sections, each having a cylindrical flange and a radial flange, arranged back to back with the radial flanges fastened together, a pair of right-angled lugs secured to the insides of the opposite cylindrical flanges and having their ends projecting inwardly from the side edges of the shoe, together with a steady-rest pin projecting from one side of the radial flanges opposite one of said lugs.

In testimony whereof, I have hereunto signed my name.

LUDGER E. LA BRIE.